(12) United States Patent
Aharon et al.

(10) Patent No.: US 7,907,777 B2
(45) Date of Patent: Mar. 15, 2011

(54) MANIFOLD LEARNING FOR DISCRIMINATING PIXELS IN MULTI-CHANNEL IMAGES, WITH APPLICATION TO IMAGE/VOLUME/VIDEO SEGMENTATION AND CLUSTERING

(75) Inventors: Shmuel Aharon, West Windsor, NJ (US); Leo Grady, Yardley, PA (US); Thomas Schiwietz, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 888 days.

(21) Appl. No.: 11/273,187

(22) Filed: Nov. 14, 2005

(65) Prior Publication Data

US 2006/0165284 A1 Jul. 27, 2006

Related U.S. Application Data

(60) Provisional application No. 60/647,357, filed on Jan. 25, 2005.

(51) Int. Cl.
*G06K 9/34* (2006.01)
*G06K 9/48* (2006.01)
(52) U.S. Cl. ........................ 382/173; 382/199
(58) Field of Classification Search .................. 382/173, 382/199
See application file for complete search history.

(56) References Cited

U.S. PATENT DOCUMENTS

2006/0093194 A1 5/2006 Grady

OTHER PUBLICATIONS

He, Xiaofei—"Locality Preserving Projections"—2003—In Advances in Neural Information Processing Systems 16, http://citeseerx.ist.psu.edu/viewdoc/summary?doi=10.1.1.9.3597.*
Shi, Jianbo—"Normalized cuts and image segmentation"—2000—IEEE, pp. 888-905.*
Grady, Leo—"Space-variant computer vision: A graph-theoretic approach"—Aug. 2003—http://eslab.bu.edu/publications/theses/2004/ under grady2004space_phd.pdf.*
Mortensen, Eric—"Interactive Segmentation with intelligent scissors"—Graphical models and Image Processing 1998, pp. 349-384.*
Funka-Lea, Gareth—"Multi-label image segmentation for medical applications based on graph-theoretic electrical potentials"—ECCV04—May 2004.*
He, Xiaofei, et al., "Locality Preserving Projections (LPP)", Advances in Neural Information Processing Systems, 16 (NIPS 2003), ser. Advances in Neural Information Processing Systems, Vancouver, Canada, 2003.
P. Perona and J. Malik, "Scale-space and edge detection using anisotropic diffusion," *IEEE Transactions on Pattern Analysis and Machine Intelligence*, vol. 12, No. 7, pp. 629-639, Jul. 1990.
Y. Boykov, O. Veksler, and R. Zabih, "A new algorithm for energy minimization with discontinuities" in *Energy Minimization Methods in Computer Vision and Pattern Recognition. Second International Workshop*. EMMCVPR'99, York UK, Jul. 26-29, 1999., H.-E.-R. Pelillo-M., Ed., Jul. 26-29, 1999, pp. 205-220.

(Continued)

*Primary Examiner* — Bhavesh M Mehta
*Assistant Examiner* — Bernard Krasnic
(74) *Attorney, Agent, or Firm* — Donald B. Paschburg (57) ABSTRACT

A manifold learning technique is applied to the problem of discriminating an object boundary between neighboring pixels/voxels in an image. The manifold learning technique is referred to as locality preserving projections. The application is for multi-channel images, which may include registered images/volumes, a time series of images/volumes, images obtained using different pulse sequences or contrast factors, radar and color photographs.

17 Claims, 9 Drawing Sheets

OTHER PUBLICATIONS

J. Shi and J. Malik, "Normalized cuts and image segmentation," *IEEE Transactions on Pattern Analysis and Machine Intelligence*, vol. 22, No. 8, pp. 888-905, Aug. 2000.

E. Mortensen and W. Barrett, "Interactive segmentation with intelligent scissors," *Graphical Models in Image Processing*, 1998.

L. Grady, "Space-variant computer vision: A graph-theoretic approach," Ph.D. dissertation, Boston University, Boston, MA, 2004.

L. Grady and G. Funka-Lea, "Multi-label image segmentation for medical applications based on graph-theoretic electrical potentials," in *Computer Vision and Mathematical Methods in Medical and Biomedical Image Analysis, ECCV 2004 Workshops CVAMIA and MMBIA*, ser. Lecture Notes in Computer Science, M. Šonka, I. A. Kakadiaris, and J. Kybic, Eds., No. LNCS3I 17. Prague, Czech Republic Springer, May 2004, pp. 230-245.

M. J. Black, G. Sapiro, D. H. Marimont, and D. Heeger, "Robust anisotropic diffusion," *IEEE Transactions on Image Processing*, vol. 7, No. 3, pp. 421-432, Mar. 1998.

R. Adams and L. Bischof, "Seeded region growing," *IEEE Transactions on Pattern Analysis and Machine Intelligence*, vol. 16, No. 6, pp. 641-647, 1994.

R. Merris, "Laplacian matrices of graphs: A survey," *Linear Algebra and its Applications*, vol. 197, 198, pp. 143-176, 1994.

\* cited by examiner

MANIFOLD LEARNING FOR DISCRIMINATING PIXELS IN MULTI-CHANNEL IMAGES, WITH APPLICATION TO IMAGE/VOLUME/VIDEO SEGMENTATION AND CLUSTERING

CROSS-REFERENCE TO RELATED APPLICATIONS

This application claims the benefit of U.S. Provisional Application No. 60/647,357 filed Jan. 25, 2005, which is incorporated herein by reference.

BACKGROUND OF THE INVENTION

This application relates to image processing methods and systems, including methods and systems to segment objects in images.

Many image analysis and filtering techniques require a notion of how likely two neighboring pixels/voxels are to belong to the same object. Examples of this type of algorithm include anisotropic diffusion, Dirichlet filtering, region growing, graph cuts, normalized cuts, intelligent scissors/livewire, the isoperimetric algorithm and the recently developed random walker algorithm. As first introduced by Perona and Malik, and later reinforced, the typical function for assigning diffusion constants (i.e., graph weights) is $$w_{ij} = \exp\frac{(\|z_i - z_j\|^2)}{\sigma^2}, \quad \text{Eq. (1)}$$

where $w_{ij}$, is the weight between pixels i and j, $z_i$ is a vector representing the value at pixel i (e.g., intensity, color) and $\sigma$ is a free parameter.

Unfortunately, a method of computation for the norm in Eq. (1) remains undefined. When $z_i$ is a one-dimensional intensity, this problem is not an issue, since most standard norms default to a simple subtraction between the intensities. However, multi-channel images are common in the medical, industrial and graphics communities. Such images may arise as a result of the registration of multiple images taken from different time points, multiple images taken with different contrast agents and/or pulse sequences, "hyperspectral" imagery taken from radar and, perhaps most commonly, color images (in which case the $z_i$ vector typically represents the RGB values at pixel i.

For lack of a more principled choice, the norm in Eq. (1) is typically taken as the Euclidean, $L^2$, norm or the $L^\infty$ norm. However, it has been widely noted how inadequate the Euclidean norm is in almost all spaces (e.g., color images).

The present methods of image processing and determining weighting coefficients for pixels in an image do not yield completely satisfactory results, particularly when processing color images. Accordingly, new and improved methods and systems for processing images to segment objects and to determine weighting coefficients are needed.

SUMMARY OF THE INVENTION

In accordance with one aspect of the present invention, a conjugate norm, based on the recently developed locality preserving projections (LPP) algorithm, is used to develop weighting coefficients. A conjugate norm of a vector, $z_i$, with respect to a matrix A, denoted $\|\bullet\|_A$, is given by the inner product In accordance with one aspect of the present invention, a conjugate norm, based on the recently developed locality preserving projections (LPP) algorithm, is used to develop weighting coefficients. A conjugate norm of a vector, $z_i$, with respect to a matrix A, denoted $\|\bullet\|_A$, is given by the inner product $<z_i, Az_i> = z_i^T A z_i$.

Examples of conjugate norms are the Euclidean distance (with A equal to the identity matrix) and the Mahalanobis distance (with A equal to the covariance matrix).

In accordance with another aspect of the present invention, a method of analyzing an image is provided. In accordance with the method, a weighting coefficient is established for each pixel in the image using a conjugate norm in the form $\|\bullet\|Q^T Q$ or in the form $\|\bullet\|Q^T \Lambda Q$ and a system of equations is solved relating to the image using the weighting coefficients.

A set of values is formed when solving the system of equations. In accordance with another aspect of the present invention, the method further includes processing the set of values to segment an object in the image.

In accordance with another aspect of the present invention, the processing involves clustering or segmentation.

In accordance with a further aspect of the present invention, the weighting coefficient for each pixel in the image is determined in accordance with the following equation:

$$w_{ij} = \exp\left[\frac{(z_i - z_j)^T Q^T \Lambda Q (z_i - z_j)}{\sigma^2}\right]$$

In accordance with another aspect of the present invention, the step of solving a system of equations can involve the method of anisotropic diffusion, the method of Dirichlet filtering, the method of region growing, the method of graph cuts, the method of normalized cuts, the method of intelligent scissors/live wire, the method of the isoperimetric algorithm, and the method of the random walker algorithm.

In accordance with a further aspect of the present invention, a method of setting discriminative edge weights when processing an image is provided. In accordance with this aspect of the invention, a weighting coefficient is established for each pixel in the image using a conjugate norm in the form $\|\bullet\|Q^T Q$ or in the form $\|\bullet\|Q^T \Lambda Q$. In a preferred embodiment, the weighting coefficient for each pixel is determined in accordance with the following equation:

$$w_{ij} = \exp\left[\frac{(z_i - z_j)^T Q^T \Lambda Q (z_i - z_j)}{\sigma^2}\right]$$

In accordance with another aspect of the present invention, a system for analyzing an image is provided. The system includes a computer and an image processing application loaded on the computer system. The imaging processing application establishes a weighting coefficient for each pixel in the image using a conjugate norm in the form $\|\bullet\|Q^T Q$ or in the form $\|\bullet\|Q^T \Lambda Q$ and solves a system of equations relating to the image using the weighting coefficient, and in general performs all of the previously described steps.

DESCRIPTION OF A PREFERRED EMBODIMENT

Locality preserving projections ("LPP") were designed to provide an (extremely) inexpensive computation that yields a linear discrimination for purposes of dimensionality reduction onto a lower-dimensional manifold. LPP methods maintain the difference between edges to allow better discrimination.

It has been shown that LPP compares favorably to a typical principle components analysis. See, for example, X. He and P. Niyogi, "Locality preserving projections," in *Advances in Neural Information Processing Systems* 16 (*NIPS* 2003), ser. Advances in Neural Information Processing Systems, Vancouver, Canada, 2003. Advantages of LPP are linearity, generalization beyond the "training" points and robustness to outliers.

One drawback of LPP in the typical manifold learning context is that it requires specification of a graph (i.e., neighborhood) of each point, which is often arbitrary. However, in the context of image processing, especially the graph-based methods listed above, a neighborhood has already been defined that is based upon the spatial location of the neighboring pixels.

For purposes of exposition, define a graph [14] as a pair $G=(V, E)$ with vertices (nodes) $v \in V$ and edges $e \in E \subset V \times V$. An edge, e, spanning two vertices, $v_i$ and $v_j$, is denoted by $e_{ij}$. See, for example, F. Harary, *Graph Theory*. Addison-Wesley, 1994. A weighted graph assigns a value to each edge called a weight. The weight of an edge, $e_{ij}$, is denoted by $w(e_{ij})$ or $w_{ij}$, and, for purposes herein, is nonnegative and real. The degree of a vertex is $d_i = \Sigma w(e_{ij})$ for all edges $e_{ij}$ incident on $v_i$.

In a typical image processing context, a node corresponds to a pixel/voxel and edges are taken between each node in the fashion of a 4-connected or 8-connected lattice.

The Laplacian matrix of a graph is defined as:

$$L_{v_i v_j} = \begin{cases} d_{vi} & \text{if } i = j, \\ -w_{ij} & \text{if } vi \text{ and } vj \text{ are adjacent nodes}, \\ 0 & \text{otherwise}, \end{cases}$$

where $L_{v_i v_j}$ is used to indicate that the matrix L is indexed by vertices $v_i$ and $v_j$.

The LPP algorithm requires solution of the following generalized eigenvector problem $$ZLZ^T x = \lambda ZDZ^T x, \qquad \text{Eq. (4)}$$

where Z is the K×N matrix with each $z_i$ vector as a column and D is the diagonal matrix defined by $D_{ii}=d_i$. Denote the eigenvectors of Eq. (4) by Q, where each eigenvector is a row of Q, and the eigenvalues by the diagonal matrix $\Lambda_{ii}=\lambda_i$. The computation of Eq. (4) is very inexpensive, since the generalized eigenproblem must only be solved for a matrix of size K×K, where K is the number of channels. For example, a color image has three channels (red, green and blue) and therefore the matrices in question are 3×3, regardless of the image/volume size.

Therefore, the solution to Eq. (4) is both extremely inexpensive and parameter-free. The conjugate norm we propose in computing the weights of (1) is therefore in the form $\|\bullet\|_Q^T{}_Q$ or $\|\bullet\|_Q^T{}_{\Lambda Q}$. A preferred form is:

$$w_{ij} = \exp\left(\frac{(z_i - z_j)^T Q^T \Lambda Q(z_i - z_j)}{\sigma^2}\right).$$

where Q is the eigenvector of Eq. (4).

These weighting coefficients are used in various image processing algorithms. For example, the weighting coefficients specified above can be used in algorithms using anisotropic diffusion. See, for example, P. Perona and J. Malik, "Scale-space and edge detection using anisotropic diffusion," *IEEE Transactions on Pattern Analysis and Machine Intelligence*, vol. 12, no. 7, pp. 629-639, July 1990. The weighting coefficients specified herein can be used in algorithms using Dirichlet filtering. See, for example, U.S. patent application Ser. No. 11/221,025, filed Sep. 7, 2005. The weighting coefficients specified herein can be used in algorithms using region growing. See, for example, R. Adams and L. Bischof, "Seeded region growing," *IEEE Transactions on Pattern Analysis and Machine Intelligence*, vol. 16, no. 6, pp. 641-647, 1994. The weighting coefficients specified herein can be used in algorithms using graph cuts and in algorithms using normalized cuts. See, for example, Y. Boykov, 0. Veksler, and R. Zabih, "A new algorithm for energy minimization with discontinuities' in *Energy Minimization Methods in Computer Vision and Pattern Recognition. Second International Workshop. EMMCVPR '99*, York UK, 26-29 Jul. 1999, H.-E.-R. Pelillo-M., Ed., 26-29 Jul. 1999, pp. 205-220 and J. Shi and J. Mahk, "Normalized cuts and image segmentation:' *IEEE Transactions on Pattern Analysis and Machine Intelligence*, vol. 22, no. 8, pp. 888-905, August 2000, respectively.

The weighting coefficients specified herein can be also used in algorithms using intelligent scissors/live-wire. See, for example, E. Mortensen and W. Barrett, "Interactive segmentation with intelligent scissors," *Graphical Models in Image Processing*, 1998. The weighting coefficients specified herein can also be used in algorithms using the isoperimetric algorithm. See, for example, L. Grady, "Space-variant computer vision: A graph-theoretic approach:' Ph.D. dissertation, Boston University, Boston, Mass., 2004 and in U.S. Provisional Patent Application No. 60/627,978, filed Nov. 15, 2004. The weighting coefficients specified herein can also be used in algorithms using the recently developed random walker algorithm. See, for example, L. Grady and G. Funka-Lea, "Multi-label image segmentation for medical applications based on graph-theoretic electrical potentials," in *Computer Vision and Mathematical Methods in Medical and Biomedical Image Analysis, ECCV 2004 Workshops CVAMIA and MMBIA*, ser. Lecture Notes in Computer Science, M. Šonka, I. A. Kakadiaris, and J. Kybic, Eds., no. LNCS31I 17. Prague, Czech Republic Springer, May 2004, pp. 230-245. See, also, U.S. Provisional Patent Application No. 60/628,035, filed Nov. 15, 2004.

Figure 1:
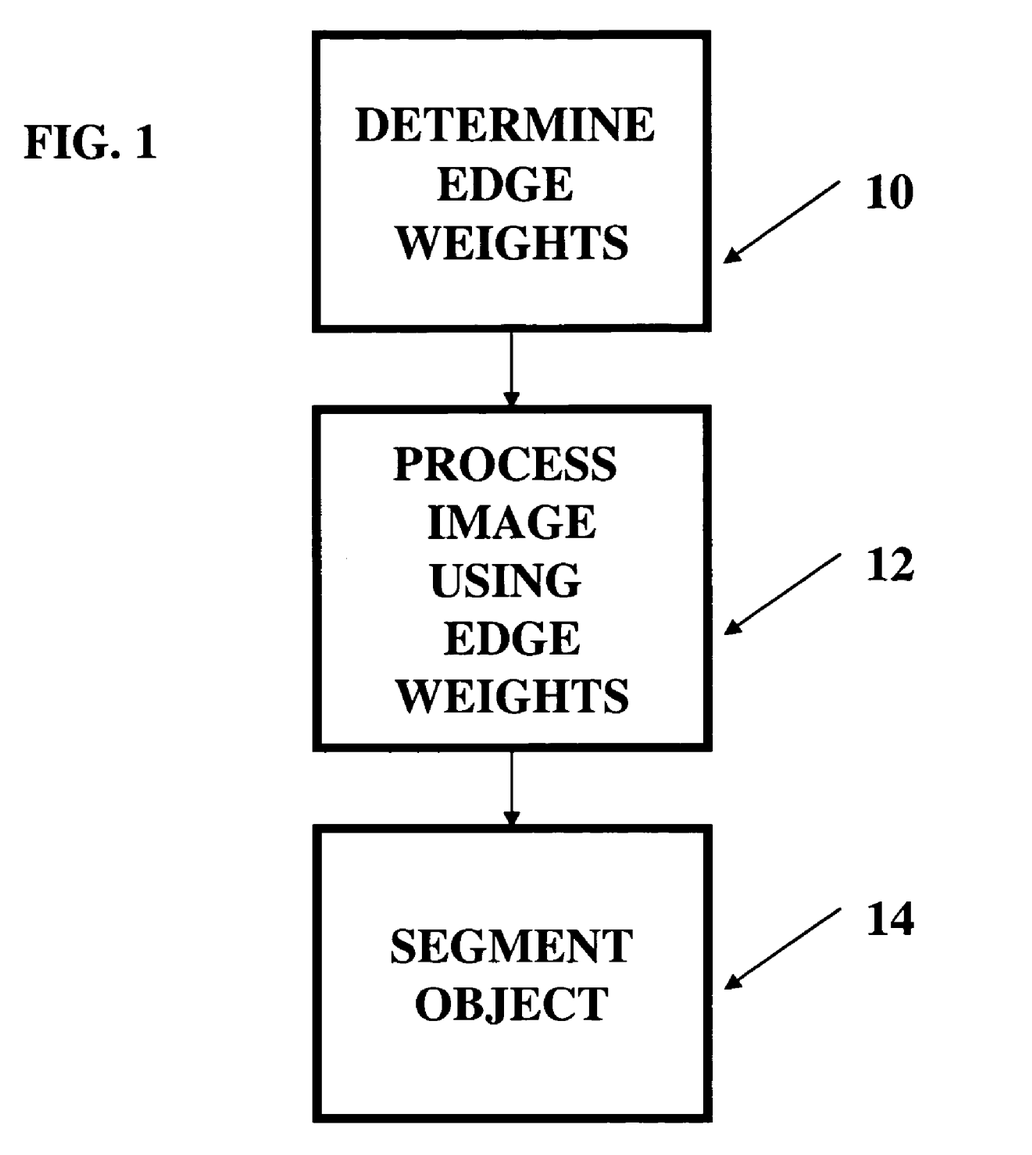
FIG. 1 illustrates a method of processing an image in accordance with one aspect of the present invention.

Referring to FIG. 1, a method of processing an image in accordance with one aspect of the present invention is illustrated. In step 10, the edge weights (or weighting coefficients) are determined for each pixel as specified above. In step 12, a system of equations is solved. The system of equations depends on the image processing algorithm used. The solution to the system of equations generates a set of values that represent the original image being processed. In step 14, the set of values can be further processed to segment objects in the original image.

Figure 2:
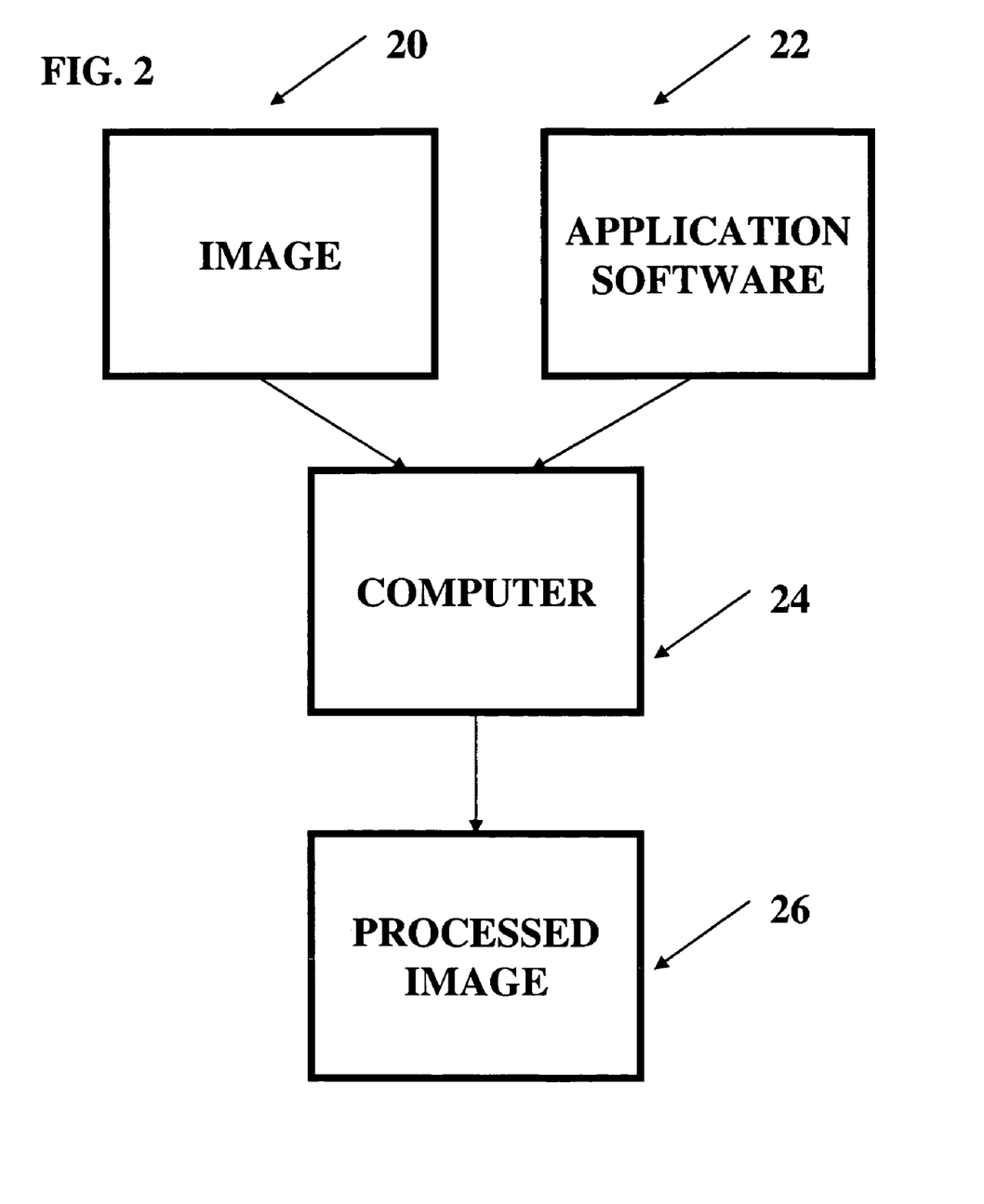
FIG. 2 illustrates a system of processing an image in accordance with one aspect of the present invention.

A system to process an image in accordance with one aspect of the present invention is illustrated in FIG. 2. Application software 22 is loaded into a computer 24. The application software 22 includes image processing software to process images. Various image processing application software packages 22 are known in the art, and include the capability to segment selected objects in an image. An image 20 is loaded into computer 24 for processing. The computer performs imaging processing steps, for example, those steps specified in FIG. 1, and outputs a desired image. By way of example only, the computer can use the weighting coefficients specified herein and any one of the described image processing algorithms to segment objects in the image 20 to generate another image 26.

Figure 3:
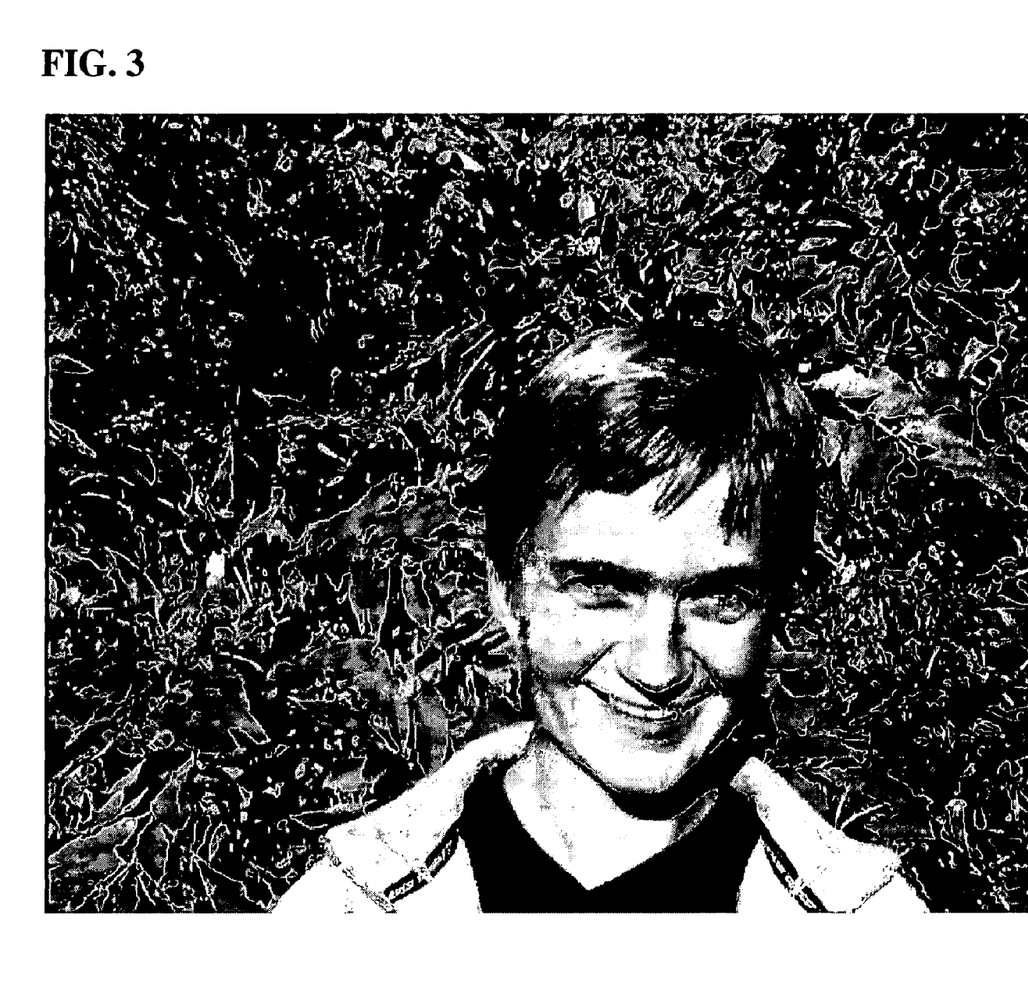
FIG. 3 illustrates an image that is processed according to one aspect of the present invention.
Figure 4:
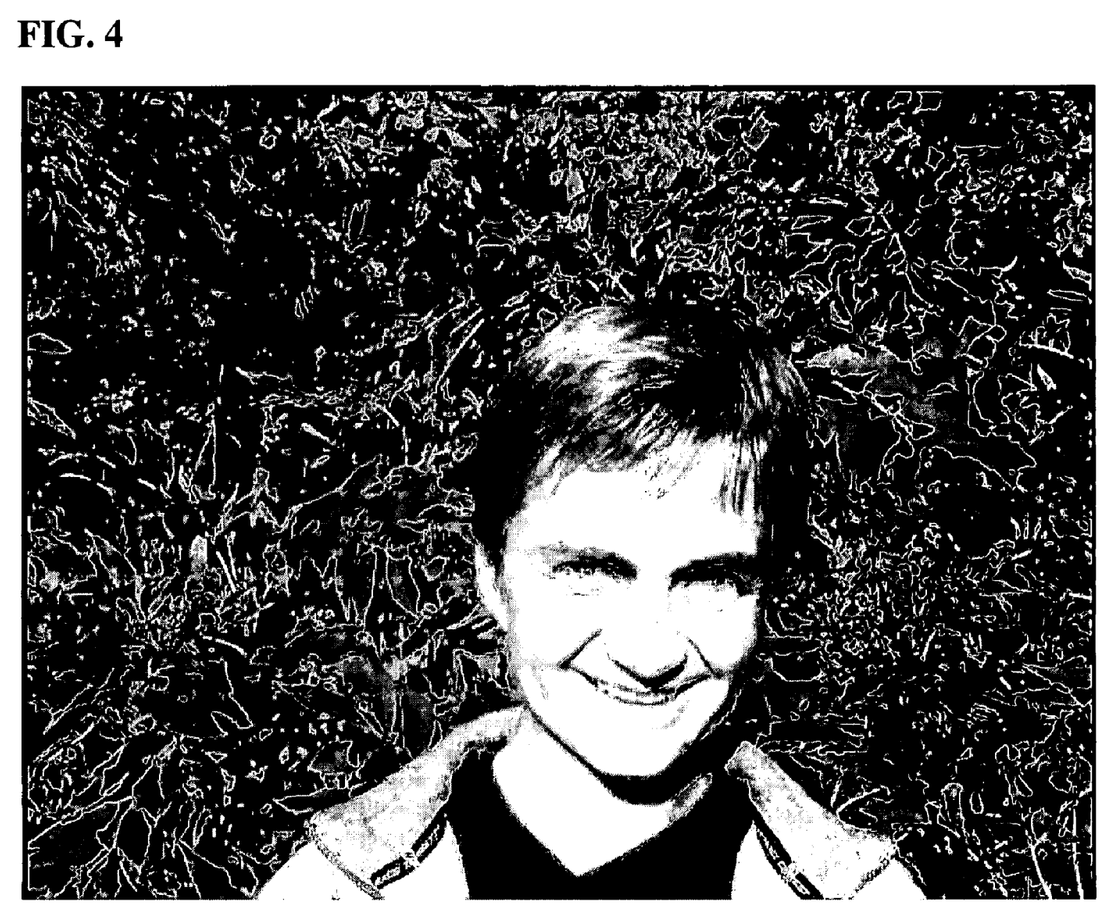
FIGS. 4 to 6 illustrate the RGB components of the image of FIG. 3.
Figure 5:
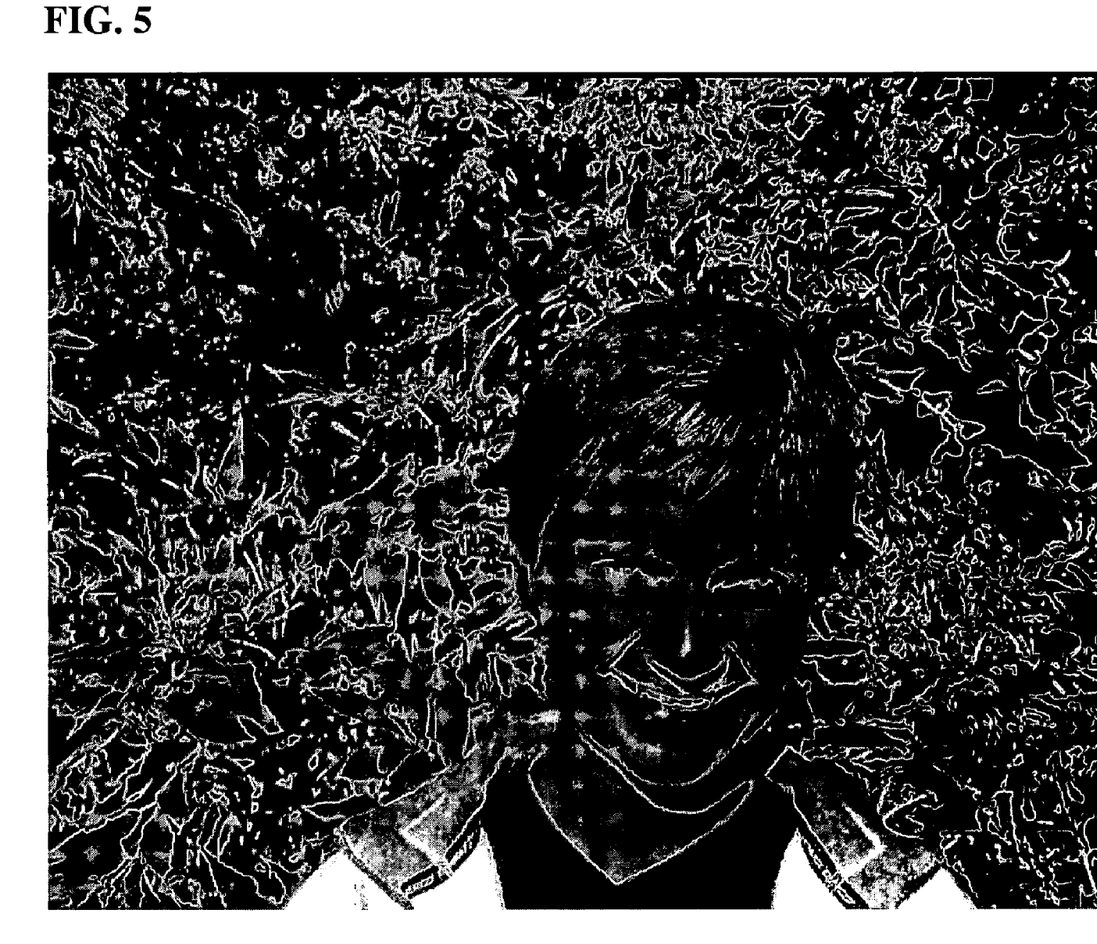
Figure 6:
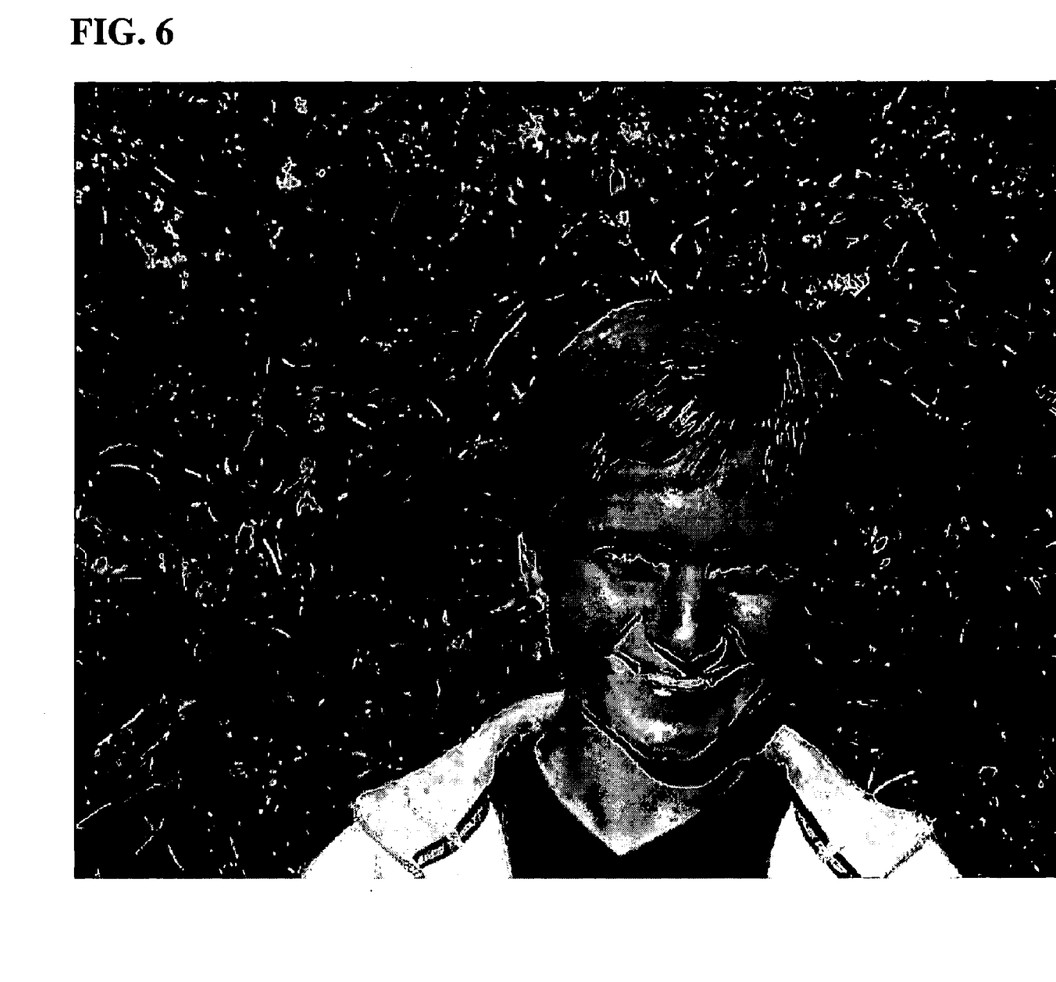
Figure 7:
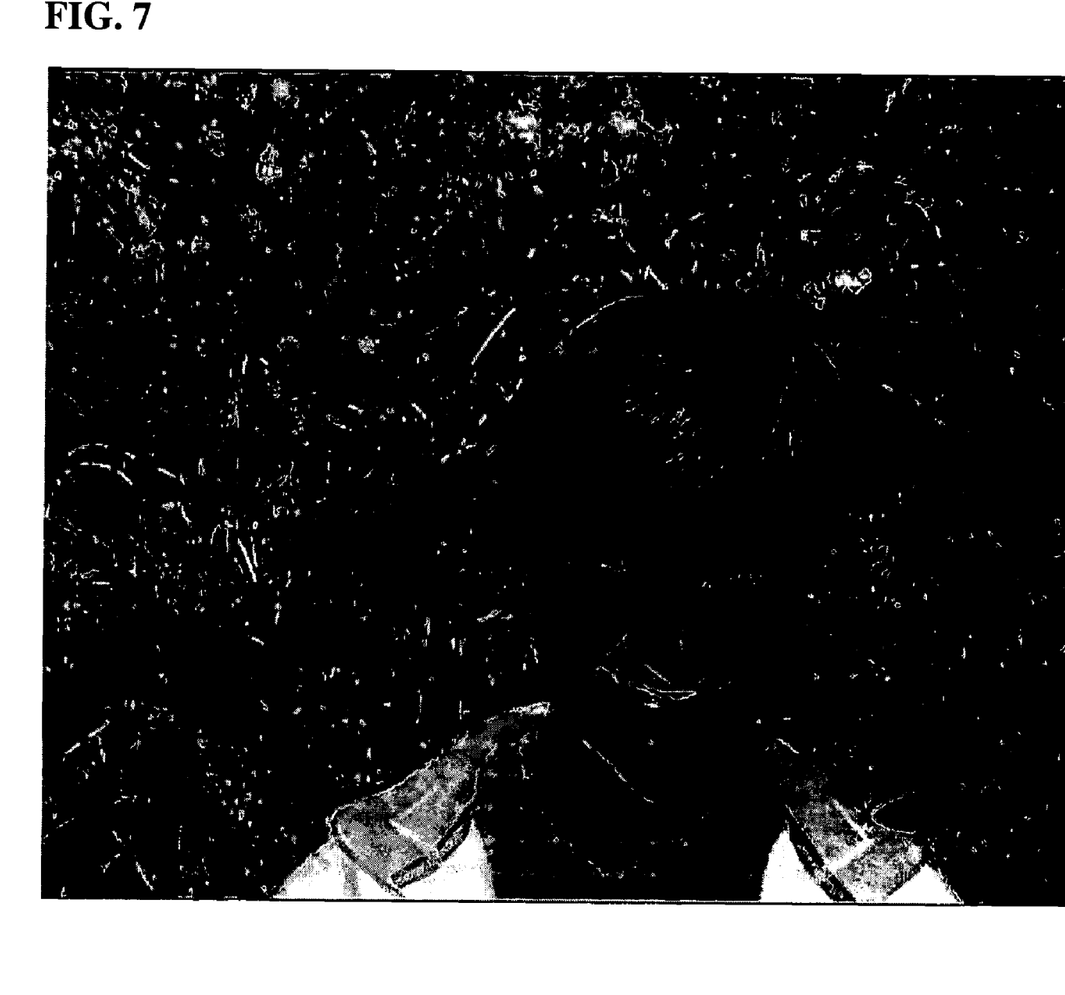
FIGS. 7 to 9 illustrate LPP components of the image of FIG. 3 generated in accordance with the present invention.
Figure 8:
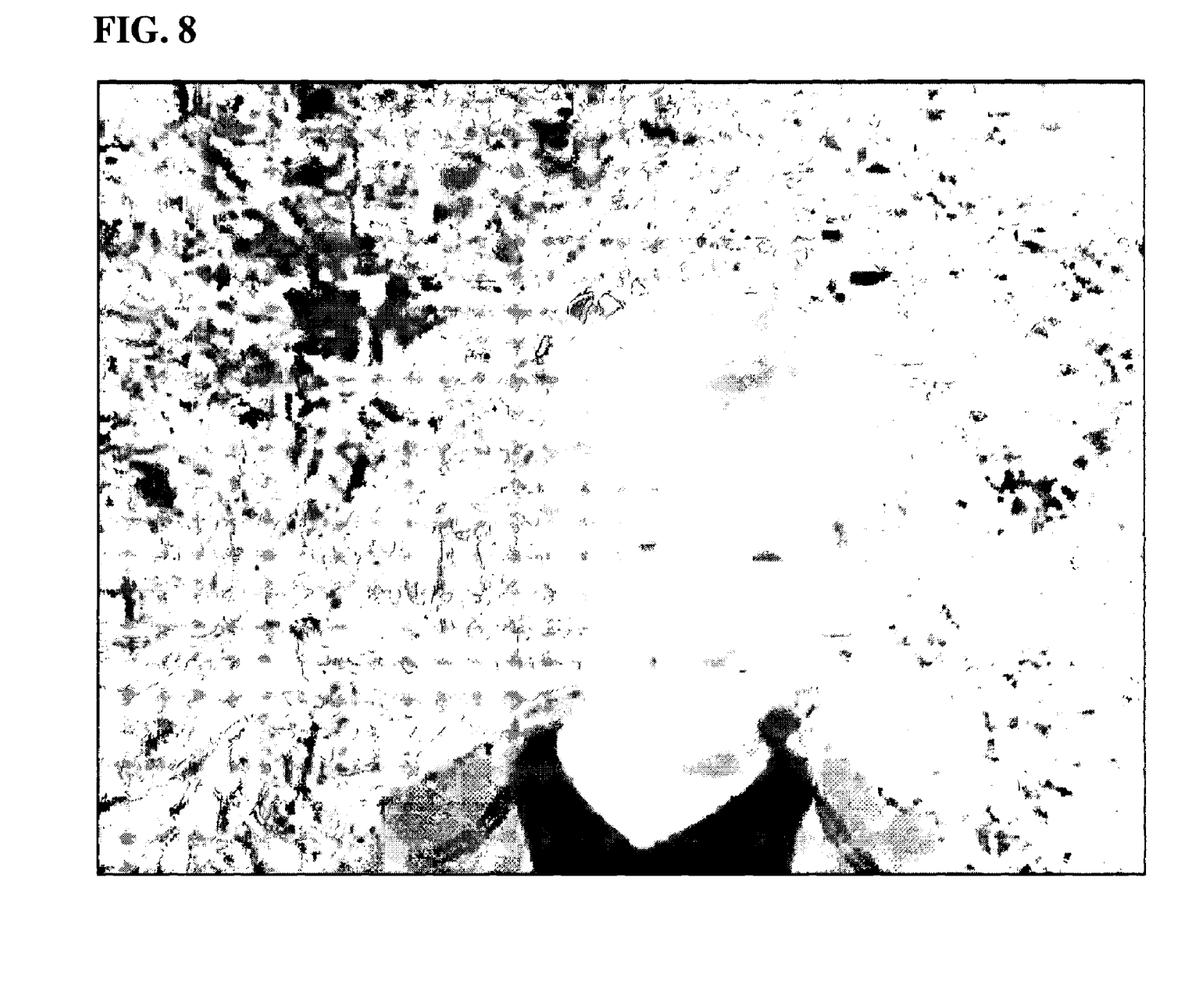
Figure 9:
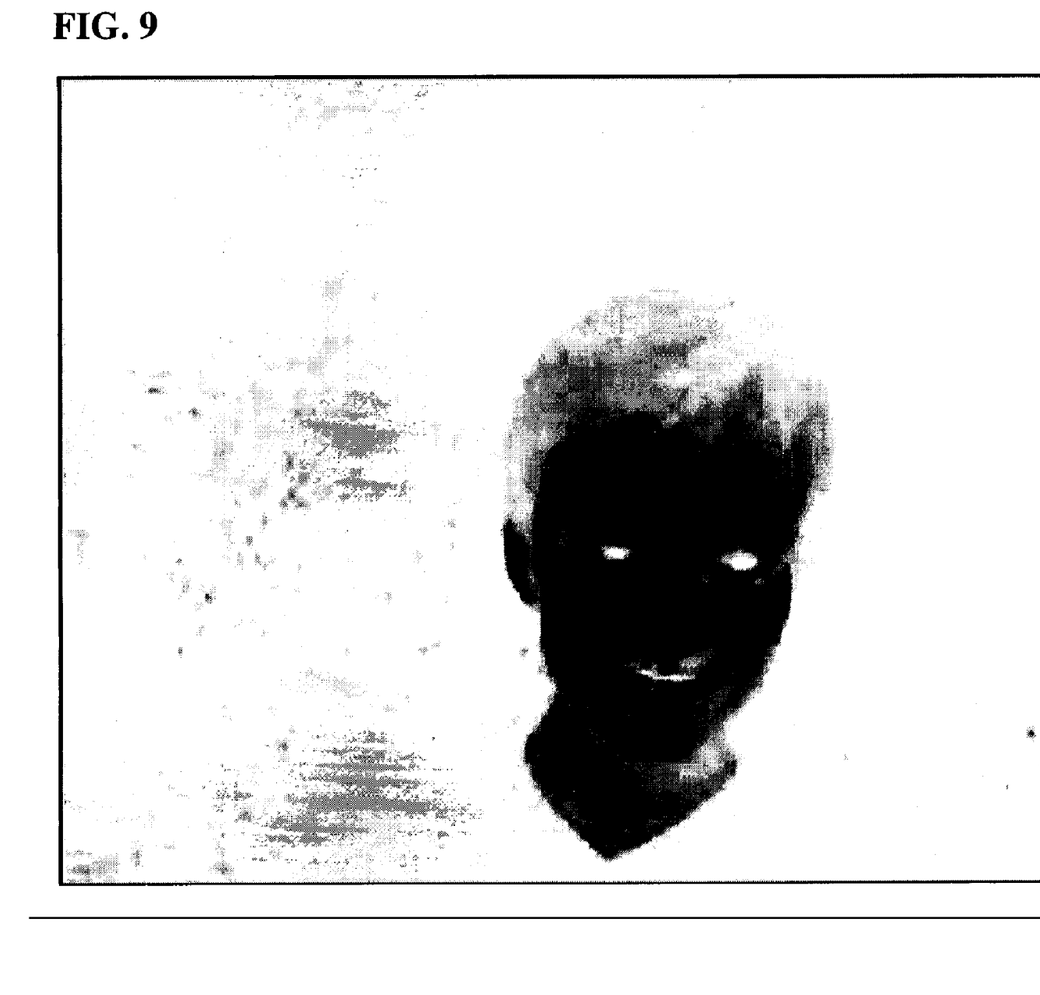

FIG. 3 illustrates an image. FIGS. 4 to 6 illustrate red, green and blue components of the image of FIG. 3. FIGS. 7 to 9 illustrate the LPP components of the image of FIG. 3 generated using the weighting coefficients of the present invention.

The projected component channels of FIGS. 7 to 9 are more discriminative of the object boundaries than the RGB channels of FIGS. 4 to 6. Thus, the edge weights defined in the space illustrated in FIGS. 7 to 9 are more discriminative of object boundaries. Specifically, pixels that all belong to one object in FIGS. 7 to 9 tend to have the same intensity in each component, as compared with objects in the RGB channels of FIGS. 4 to 6. This feature is crucial for anisotropic filtering algorithms (e.g., diffusion) as well as segmentation/analysis algorithms that strive to detect object boundaries.

An inexpensive, parameter-free, approach for setting discriminative edge weights (diffusion constants) that respect object boundaries in multi-channel images by leveraging recent results in manifold learning is presented. This invention has specific application to registered images/volumes, a time series of images/volumes, images obtained using different pulse sequences or contrast factors, radar and color photographs.

Future work might include using these components to learn image priors, to employ an image topology not given by the lattice (e.g., K-NN in feature space) or to use a weighted Laplacian matrix in place of the unweighted matrix. See, for example, Y. Boykov, 0. Veksler, and R. Zabih, "A new algorithm for energy minimization with discontinuities' in *Energy Minimization Methods in Computer Vision and Pattern Recognition. Second International Workshop. EMMCVPR '99*, York UK, 26-29 Jul. 1999, H.-E.-R. Pelillo-M., Ed., 26-29 Jul. 1999, pp. 205-220.

The following references provide background information generally related to the present invention and are hereby incorporated by reference: [1] P. Perona and J. Malik, "Scale-space and edge detection using anisotropic diffusion," *IEEE Transactions on Pattern Analysis and Machine Intelligence*, vol. 12, no. 7, pp. 629-639, July 1990; [2] U.S. patent application Ser. No. 11/221,025, filed Sep. 7, 2005; [3] R. Adams and L. Bischof, "Seeded region growing," *IEEE Transactions on Pattern Analysis and Machine Intelligence*, vol. 16, no. 6, pp. 641-647, 1994; [4] Y. Boykov, 0. Veksler, and R. Zabih, "A new algorithm for energy minimization with discontinuities' in *Energy Minimization Methods in Computer Vision and Pattern Recognition. Second International Workshop. EMMCVPR '99*, York UK, 26-29 Jul. 1999, H.-E.-R. Pelillo-M., Ed., 26-29 Jul. 1999, pp. 205-220; [5] J. Shi and J. Mahk, "Normalized cuts and image segmentation:' *IEEE Transactions on Pattern Analysis and Machine Intelligence*, vol. 22, no. 8, pp. 888-905, August 2000; [6] E. Mortensen and W. Barrett, "Interactive segmentation with intelligent scissors," *Graphical Models in Image Processing*, 1998; [7] L. Grady, "Space-variant computer vision: A graph-theoretic approach:' Ph.D. dissertation, Boston University, Boston, Mass., 2004; [8] U.S. Provisional Patent Application Ser. No. 60/627,978, filed Nov. 15, 2004; [9] L. Grady and G. Funka-Lea, "Multi-label image segmentation for medical applications based on graph-theoretic electrical potentials," in *Computer Vision and Mathematical Methods in Medical and Biomedical Image Analysis, ECCV 2004 Workshops CVAMIA and MMBIA*, ser. Lecture Notes in Computer Science, M. Šonka, I. A. Kakadiaris, and J. Kybic, Eds., no. LNCS3I 17. Prague, Czech Republic Springer, May 2004, pp. 230-245; [10] U.S. Provisional Patent Application Ser. No. 60/628,035, filed Nov. 15, 2004; [11] M. J. Black, G. Sapiro, D. H. Marimont, and D. Heeger, "Robust anisotropic diffusion," *IEEE Transactions on Image Processing*, vol. 7, no. 3, pp. 421-432, March 1998; [12] A. Jain, Fundamentals of Digital Image Processing. Prentice-Hall, Inc., 1989; [13] X. He and P. Niyogi, "Locality preserving projections," in *Advances in Neural Information Processing Systems* 16 (*NIPS* 2003), ser. Advances in Neural Information Processing Systems, Vancouver, Canada, 2003; [14] F. Harary, *Graph Theory*. Addison-Wesley, 1994; and [15] R. Merris, "Laplacian matrices of graphs: A survey," *Linear Algebra and its Applications*, vol. 197, 198, pp. 143-176, 1994.

While the specification has primarily described the invention with respect to pixels, it is also applicable to sets of image data having voxels, or three dimensions of data. Thus, the word pixel can also refer to voxel. The use of the word node shall be understood to refer to either pixel or voxel.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

We claim:

1. A method of processing an image by a digital processor, comprising:

calculating by the digital processor of a weighting coefficient $w_{ij}$ for each pixel i with multi-channel values represented by a vector $z_i$ and a neighboring pixel j with multi-channel values represented by a vector $z_j$ in the image based on a spatial location of the neighboring pixel by substituting in an expression for the weighting coefficient a term $\|z_i-z_j\|^2$ with a conjugate norm in a form $\|\bullet\|Q^T Q$ or in a form $\|\bullet\|Q^T \Lambda Q$, wherein each pixel is assigned a multi-channel value, and each pixel is connected locally to an adjacent pixel independent of the multi-channel value, wherein:

Q is a matrix representation of an eigenvector that depends on a Laplacian matrix of a graph defined by pixels of the image;

Λ is a matrix representation of an eigenvalue that depends on the Laplacian matrix;

T in an exponent indicates a transposition of a matrix; and $\|\bullet\|$ indicates a norm of any expression represented by •; and generating for further processing a processed image by the digital processor using the weighting coefficients; and segmenting an object in the processed image using the weighting coefficients, wherein the weighting coefficient for each pixel and an adjacent pixel is determined in accordance with the following equation:

$$w_{ij} = \exp\left[\frac{-(z_i - z_j)^T Q^T \Lambda Q(z_i - z_j)}{\sigma^2}\right],$$

wherein i indicates a pixel and j indicates a pixel, $w_{ij}$ represents the weighting coefficient between pixels i and j, $z_i$ represents a color vector of a pixel i, $z_j$ represents a color vector of a pixel j and σ is a free parameter.

2. The method as claimed in claim 1, comprising solving a system of equations relating to the image using the weighting coefficients.

3. The method as claimed in claim 2, further comprising forming a set of values when solving the system of equations.

4. The method as claimed in claim 3, further comprising processing the set of values to segment an object in the image.

5. The method as claimed in claim 4, wherein the processing involves clustering.

6. The method as claimed in claim 1, wherein the weighting coefficients for each pixel in the image are used in anisotropic diffusion.

7. The method as claimed in claim 1, wherein the weighting coefficients for each pixel in the image are used in Dirichlet filtering.

8. The method as claimed in claim 1, wherein the weighting coefficients for each pixel in the image are used in region growing.

9. The method as claimed in claim 1, wherein the weighting coefficients for each pixel in the image are used in graph cuts.

10. The method as claimed in claim 1, wherein the weighting coefficients for each pixel in the image are used in normalized cuts.

11. The method as claimed in claim 1, wherein the weighting coefficients for each pixel in the image are used in intelligent scissors/live wire.

12. The method as claimed in claim 1, wherein the weighting coefficients for each pixel in the image are used in an isoperimetric algorithm.

13. The method as claimed in claim 1, wherein the weighting coefficients for each pixel in the image are used in a random walker algorithm.

14. A method of setting discriminative edge weights in a method for processing an image, comprising establishing by a processor of a weighting coefficient for each pixel and a neighboring pixel in the image based on a spatial location of the neighboring pixel by using in an expression to directly calculate the weighting coefficient a conjugate norm in a form $\|\cdot\| Q^T Q$ or in a form $\|\cdot\| Q^T \Lambda Q$, wherein each pixel is assigned a multi-channel value, and each pixel is connected locally to an adjacent pixel independent of the multi-channel value and processing the image using the weighting coefficients, wherein Q is a matrix representation of an eigenvector that depends on a Laplacian matrix of a graph defined by pixels of the image;

Λ is a matrix representation of an eigenvalue that depends on the Laplacian matrix;

T in an exponent indicates a transposition of a matrix; and $\|\cdot\|$ indicates a norm of any expression represented by a • and segmenting an object in the processed image using the weighting coefficients, wherein the weighting coefficient for each pixel and a neighboring pixel is determined in accordance with the following equation:

$$w_{ij} = \exp\left[\frac{-(z_i - z_j)^T Q^T \Lambda Q(z_i - z_j)}{\sigma^2}\right],$$

wherein i indicates a pixel and j indicates a pixel, $w_{ij}$ represents the weighting coefficient between pixels i and j, $z_i$ represents a color vector of a pixel i, $z_j$ represents a color vector of a pixel j and σ is a free parameter.

15. A system for analyzing an image, comprising:
a computer; and
an image processing application loaded on the computer system;
wherein the imaging processing application establishing a weighting coefficient for each pixel and a neighboring pixel in the image based on a spatial location of the neighboring pixel by using in an expression to directly calculate the weighting coefficient a conjugate norm in a form $\|\cdot\| Q^T Q$ or in a form $\|\cdot\| Q^T \Lambda Q$, wherein each pixel is assigned a multi-channel value, and each pixel is connected locally to an adjacent pixel independent of the multi-channel value and solving a system of equations relating to the image using the weighting coefficients, wherein Q is a matrix representation of an eigenvector that depends on a Laplacian matrix of a graph defined by pixels of the image;

Λ is a matrix representation of an eigenvalue that depends on the Laplacian matrix;

T in an exponent indicates a transposition of a matrix; and $\|\cdot\|$ indicates a norm of any expression represented by •; and generating for further processing a processed image by the computer using the weighting coefficients and segmenting an object the analyzed image using the weighting coefficients, wherein the weighting coefficient for each pixel and a neighboring pixel is determined in accordance with the following equation:

$$w_{ij} = \exp\left[\frac{-(z_i - z_j)^T Q^T \Lambda Q(z_i - z_j)}{\sigma^2}\right],$$

wherein i indicates a pixel and j indicates a pixel, $w_{ij}$ represents the weighting coefficient between pixels i and j, $z_i$ represents a color vector of a pixel i, $z_j$ represents a color vector of a pixel j and σ is a free parameter.

16. The system as claimed in claim 15, wherein the image processing application forms a set of values when solving the system of equations.

17. The system as claimed in claim 16, wherein the image processing application further comprising processing the set of values to segment an object in the image.

* * * * *